US 10,703,644 B2

United States Patent
Younes et al.

(10) Patent No.: US 10,703,644 B2
(45) Date of Patent: Jul. 7, 2020

(54) PRODUCED WATER TREATMENT PROCESS AT CRUDE OIL AND NATURAL GAS PROCESSING FACILITIES

(71) Applicant: Saudi Arabian Oil Company, Dhahran (SA)

(72) Inventors: Mourad Victor Younes, Abqaiq (SA); Regis Didier Alain Vilagines, Dhahran (SA); Guillaume Robert Jean-Francois Raynel, Dhahran (SA)

(73) Assignee: SAUDI ARABIAN OIL COMPANY (SA)

( * ) Notice: Subject to any disclaimer, the term of this patent is extended or adjusted under 35 U.S.C. 154(b) by 0 days.

(21) Appl. No.: 13/910,625

(22) Filed: Jun. 5, 2013

(65) Prior Publication Data
US 2014/0014492 A1    Jan. 16, 2014

Related U.S. Application Data
(60) Provisional application No. 61/672,096, filed on Jul. 16, 2012.

(51) Int. Cl.
| C02F 1/04 | (2006.01) |
| B01D 3/06 | (2006.01) |
| C02F 1/06 | (2006.01) |

(52) U.S. Cl.
CPC ............... *C02F 1/04* (2013.01); *B01D 3/065* (2013.01); *C02F 1/06* (2013.01)

(58) Field of Classification Search
CPC .... C02F 1/04; C02F 1/06; C02F 1/043; C02F 1/045; C02F 1/048; C02F 1/16; B01D 3/065

(Continued)

(56) References Cited

U.S. PATENT DOCUMENTS

| 224,364 A | 2/1880 | Tappan |
| 3,206,379 A | 9/1965 | Hill |

(Continued)

FOREIGN PATENT DOCUMENTS

| CA | 2190299 A1 | 5/1998 |
| CA | 2345595 A1 | 11/2001 |

(Continued)

OTHER PUBLICATIONS

F. Peterson & H. Zhao, An Optimized System for Advanced Multi-Effect Distillation (AMED) Using Waste Heat from Closed Gas Brayton Cycles, U.C. Berkeley Report UCBTH-05-003, Rev. E, Jan. 31, 2006.*

(Continued)

*Primary Examiner* — Prem C Singh
*Assistant Examiner* — Brandi M Doyle
(74) *Attorney, Agent, or Firm* — Bracewell LLP; Constance Gall Rhebergen; Brad Y. Chin

(57) ABSTRACT

Embodiments of the invention provide a method for producing a treated water stream. The method includes receiving a feed stream including at least one substance dissolved in a water phase, and processing the feed water stream in a plurality of stages arranged in operation from a lowest temperature and pressure to a highest temperature and pressure, to produce the treated water stream and a concentrated stream. Each stage includes a vessel, a heat exchanger, an evaporator, and a condenser. Each evaporator is configured to evaporate an amount of water using one of direct heat or indirect heat. Each condenser is configured to condense at least a portion of steam generated by a successive stage. In accordance with various embodiments, the plurality of stages is arranged in series. In other embodiments, the plurality of stages is arranged in parallel.

10 Claims, 11 Drawing Sheets

(58) Field of Classification Search
USPC ........ 203/10, 11, 21–26; 202/173, 174, 177, 202/180
See application file for complete search history.

(56) References Cited

U.S. PATENT DOCUMENTS

| | | | |
|---|---|---|---|
| 3,716,458 A * | 2/1973 | Greenfield et al. | 159/13.2 |
| 3,856,632 A | 12/1974 | Peter | |
| 3,871,968 A | 3/1975 | Wood et al. | |
| 3,926,739 A | 12/1975 | Izumi | |
| 3,968,002 A | 7/1976 | Standiford | |
| 4,239,588 A | 12/1980 | Engelhardt | |
| 4,276,117 A | 6/1981 | Geesen | |
| 4,591,413 A | 5/1986 | Peterson | |
| 4,877,536 A | 10/1989 | Bertness et al. | |
| 5,102,618 A | 4/1992 | Kveton | |
| 5,256,251 A | 10/1993 | Holcombe | |
| 5,853,549 A | 12/1998 | Sephton | |
| 6,309,513 B1 | 10/2001 | Sephton | |
| 6,355,145 B1 | 3/2002 | Kresnyak et al. | |
| 6,375,803 B1 | 4/2002 | Razzaghi et al. | |
| 6,444,095 B1 | 9/2002 | Evans et al. | |
| 6,733,636 B1 | 5/2004 | Heins | |
| 7,799,178 B2 | 9/2010 | Eddington | |
| 8,021,519 B2 | 9/2011 | Paxton | |
| 8,080,138 B2 | 12/2011 | Nirmalakhandan et al. | |
| 2006/0157338 A1 | 7/2006 | Eddington | |
| 2008/0083605 A1* | 4/2008 | Holtzapple | C02F 1/041 203/11 |
| 2011/0031101 A1 | 2/2011 | Shelley | |
| 2012/0247940 A1 | 10/2012 | Passarelli | |

FOREIGN PATENT DOCUMENTS

| | | |
|---|---|---|
| CA | 2305118 C | 3/2002 |
| EP | 0 040 093 A1 | 11/1981 |
| GB | 1234446 A | 6/1971 |
| JP | S53-80857 A | 7/1978 |
| JP | 54-152666 A | 1/1979 |
| JP | 55-145503 A | 11/1980 |
| JP | 57-180478 A | 6/1982 |
| JP | S57-111825 U | 10/1982 |
| JP | H06-500733 A | 1/1994 |

OTHER PUBLICATIONS

El-Dessouky and Ettouney, Fundamentals of Salt Water Desalination, chapter 4 Multi-Effect Evaporation, 2002.*
PCT Int'l Search Report and the Written Opinion of the Int'l Searching Authority dated Sep. 26, 2013; Int'l App. No. PCT/US2013/050645; Int'l Filing Date: Jul. 16, 2013.
Singapore Office Action dated Feb. 27, 2017 in corresponding Singapore Patent Application No. 11201408437X.
El-Dessouky et al., "Multiple Effect Evaporation", Fundamentals of Salt Water Desalination, 2002, pp. 148-229.
Peterson et al., "An Optimized System for Advanced Multi-Effect Distillation (AMED) Using Waste Heat from Closed Gas Brayton Cycles", U.C. Berkley Report UCBTH-05-003, 2006, pp. 1-17.
Examination Report dated Aug. 29, 2016 in corresponding European Application No. 13741953.7.
Japanese Office Action dated Nov. 18, 2016 of corresponding Japanese Patent Application No. 2015-523176.
EP13741953.7 European Examination Report dated Jun. 9, 2017; 5pgs.
Ahmadun, F-R., et al., "Review of Technologies for Oil and Gas Produced Water Treatment," Journal of Hazardous Materials, May 1, 2009, pp. 530-551, vol. 170, www.elsevier.com/locate/jhazmat, Elsevier B.V.
Prepared by: Interstate Oil and Gas Compact Commission and All Consulting; Prepared for: U.S. Department of Energy National Petroleum Technology Office, A Guide to Practical Management of Produced Water from Onshore Oil and Gas Operations in the United States, Oct. 2006, DE-PS26-04NT15460-02.

* cited by examiner

US 10,703,644 B2

PRODUCED WATER TREATMENT PROCESS AT CRUDE OIL AND NATURAL GAS PROCESSING FACILITIES

RELATED APPLICATION

This application is related to, and claims priority to, U.S. Provisional Patent Application Ser. No. 61/672,096, filed on Jul. 16, 2012, the disclosure of which is incorporated by reference in its entirety.

BACKGROUND

Field of the Invention

Embodiments of the invention generally relate to water desalination. More particularly, embodiments of the invention relate to systems and methods for the production of sweet water (hereinafter also referred to as "treated water"), from produced brine available at crude oil and natural gas production facilities.

Description of the Related Art

Sweet water is used in a Gas Oil Separation Plant (hereinafter referred to as "GOSP") to remove salt from crude oil. Traditionally, water is provided from an external source, for example, a distant aquifer or a seawater desalination plant, and treated using a desalination system, for example, a thermal desalination system, such as a multiple-stage flash distillation system, a multiple-effect distillation system, or a vapor compression system, as non-limiting examples.

Currently, various commercial processes are employed in steam generation for the sole application of steam assisted gravity drainage (SAGD) of an oil reservoir. This application was first mentioned as an example in 1989. The process was further developed in the early 2000's to use vapor-compression evaporators and has been continuously improved.

FIG. 1 is a schematic diagram of a conventional thermal desalination system: a multiple-stage flash distillation system. The multiple-stage flash distillation system, as shown in FIG. 1, includes multiple evaporating chambers, the coldest of which receives sea water in a feed stream. The sea water flows through a series of heat exchanger tubes and is heated at each stage before reaching an external heat exchanger, for example, a brine heater—labeled as "Heating steam" in FIG. 1. The brine heater overheats the feed water, as compared to the temperature and pressure in the first stage, to vaporize the feed water when the feed water enters the first evaporating chamber. Successive evaporating chambers in this conventional system are operated at successively decreasing levels of pressure from the first stage at the hot side (i.e., left-hand side of FIG. 1) to the last stage at the cold side (i.e., right-hand side of FIG. 1). The produced steam in each stage is condensed into fresh liquid water in a heat exchanger arranged on the top of a respective evaporating chamber. The brine is circulated to the next stage for further evaporation until it reaches the coldest stage, and then subsequently exits the system. The fresh water produced from each stage is commingled in a "distillate" line and exits the system through the coldest stage.

FIG. 2 is a schematic diagram of another conventional thermal desalination system: a multiple-effect distillation system. The multiple-effect distillation system, as shown in FIG. 2, operates in a mode similar to the multiple-stage flash distillation system shown in FIG. 1, in that successive cells are operated at decreasing levels of pressure and temperature from the first hot chamber (i.e., left hand-side of FIG. 2) to the last cold chamber (i.e., right hand-side of FIG. 2). According to this conventional system, each chamber contains a horizontal hot tube bundle that is sprayed with seawater. Heating steam flows inside the tubes of the hot tube bundle, whereby steam produced from one stage is conveyed to the next stage at a lower temperature and pressure to be condensed into liquid treated water. The steam produced in a given stage from seawater evaporation is at a higher temperature than the next stage, and therefore can be used as a heating fluid for the following stage. At the outlet of the final condenser stage, part of the warmed seawater flow can be used for recirculation at the inlet of the process, while the other part is usually discharged at sea. Brine and distillate are collected at the last stage in the process and pumped out of the multiple-effect distillation system.

FIG. 3 is a schematic diagram of another conventional thermal desalination system: a vapor compression system. The vapor compression system, as shown in FIG. 3, is generally used when no heat is available from an external source. The principle of operation of the vapor compression system is very similar to the multiple-effect distillation system shown in FIG. 2. However, the primary advantage of a vapor compression system is that steam is extracted from the last stage and compressed to a pressure above the first (i.e., hottest) chamber pressure. This allows the steam to be re-used as a heat source in the first stage chamber of the vapor compression system.

Each of these conventional thermal desalination systems requires a complex infrastructure to deliver fresh water from an external source and consumes large amounts of external energy to produce treated water for use in a GOSP facility. For example, conventional desalination plants are characterized by an energy consumption of 4 kWh/m$^3$ of desalinated sea water to which the energy cost of transporting the desalinated water to a site of use must be added. Therefore, what is needed are improved systems and methods for producing treated water from produced brine available at crude oil and natural gas production facilities, which operate at reduced costs, for example, construction, operation, and maintenance costs, and require less external energy to generate the treated water (i.e., due to the elimination of pipeline infrastructure and systems for supplying fresh water to the GOSP facility from a remote location).

SUMMARY

Generally, embodiments of the invention provide systems and methods for the in-situ production of treated water from produced brine available at crude oil and natural gas production facilities.

In particular, embodiments of the invention are directed to systems and methods that produce in-situ treated water at reduced costs, for example, construction, operation, and maintenance costs, and with lower energy consumption penalties compared with conventional thermal desalination systems. GOSP facilities, incorporating the systems and methods according to various embodiments described herein, are self-sufficient producers of treated water, effectively eliminating the need for drilling fresh water wells, the depletion of aquifer reserves, or the need to transport fresh water from a remote location, and with less impact on the environment. Accordingly, energy costs associated with the production of the treated water are significantly reduced, for example, from 4 kWh/m$^3$ to 0.2 kWh/m$^3$ on a yearly basis.

The systems and methods according to various embodiments described herein incorporate evaporation and condensation stages operating at different pressures and temperatures to minimize the energy required to generate the desired treated water within the GOSP facilities. Heat generated in these systems and according to these methods is used to evaporate water and produce steam from the produced water to further minimize energy consumption within the GOSP facilities, effectively eliminating the need for external energy sources to generate the desired treated water within the GOSP facilities. In certain embodiments, evaporation/condensation stages are combined in series, while in others the evaporation/condensation stages are combined in parallel. According to certain embodiments, each stage operates at a different pressure, whereby the system uses waste heat generated at different temperatures for processing and generating the desired treated water for external applications.

According to certain embodiments, the waste heat serves as the main source of energy for generating the treated water within the GOSP facilities, and is available in a gas compressor discharge steam, in a crude oil production stream, and/or in a produced water stream. The generated steam is partially condensed internally and totally by an air and/or water and/or seawater condenser to generate the desired treated water. The treated water can subsequently be used for various applications, for example, crude oil desalting and thermal enhancement of brine-crude oil separation processes, or mixed with fresh water from other sources to complete additional tasks within the GOSP facilities or for external applications, for example, the production of concentrated salt water, for example, brine, or distilled water as a source of water for an emergency water reservoir, or to produce steam for enhanced oil recovery.

The systems and methods according to various embodiments described herein are effective at treating produced water that has not been previously processed, for example, purified, treated, etc., even when the produced water contains an amount, for example, 1% in volume, of crude oil and dissolved gases. Various embodiments provide systems and methods that recover a substantial amount of oil contained in the brine (i.e., more than 35% recovery of the oil contained in the brine).

Accordingly, in accordance with one embodiment, there is provided a method for producing a treated water stream. The method includes steps for receiving a feed stream comprising at least one substance mixed in a water phase, and processing the feed water stream in a plurality of stages arranged in operation from a lowest temperature and pressure to a highest temperature and pressure, to produce a treated water stream and a concentrated stream. Each stage includes a vessel, a heat exchanger, an evaporator, and a condenser. Each evaporator is configured to evaporate an amount of water using one of direct heat or indirect heat. Each condenser is configured to condense at least a portion of steam generated by a successive stage.

In certain embodiments, the plurality of stages is arranged in series, whereby a first stage receiving the feed water stream is operated at the lowest temperature and pressure compared to the other stages.

In certain embodiments, the plurality of stages is arranged in parallel, each stage being configured to receive the feed water stream from a same source and further configured to exchange heat with one another.

In certain embodiments, the step for processing further includes feeding the feed water stream into the first stage operated at the lowest temperature and pressure compared to the other stages. An evaporator of the first stage is configured to produce a water vapor stream that is condensed by a condenser of the first stage to produce a first treated water stream. The step for processing further includes extracting a brine-concentrated from the evaporator of the first stage and feeding the brine-concentrated feed stream to an evaporator of a second stage. The second stage includes a higher temperature and pressure than the first stage to produce an additional treated water stream and a successive brine-concentrated stream that is fed to an evaporator of a successive stage for the plurality of stage. Each successive stage includes a higher temperature and pressure than a preceding stage. An evaporator of each successive stage i configured to produce an additional treated water stream and a successive brine-concentrated stream that is fed to an evaporator of a successive stage for the plurality of stages. Further, the step of processing further includes extracting brine from the brine-concentrated stream from an evaporator of a stage having the highest temperature and pressure compared to the other stages. The extracted brine is used to provide energy to heat the brine-concentrated stream being fed to each of the evaporators of the plurality of stages.

In certain embodiments, the extracted brine from the stage having the highest temperature and pressure compared to the other stages is used to provide energy to the evaporators of the plurality of stages from a highest temperature and pressure to a lowest temperature and pressure.

In certain embodiments, each evaporator includes a compensating heating system configured to use direct heat provided by at least one of electric heating, convective heating from a heat carrier fluid, combustion, and oxidation.

In certain embodiments, the feed water stream is a stream of brine water produced from one of a saline aquifer, a stream of brackish water from an industrial process, or a mixture of water comprising organic contaminants.

In certain embodiments, the feed water stream is a stream of brine water produced from one of a gas production field or a crude oil production field.

In certain embodiments, the feed water stream is a produced water stream available at a crude oil and natural gas processing facility, the feed water stream comprising one of a liquid or dissolved hydrocarbon or additive chemical, and the produced water stream is one of a pressure aerobic or anaerobic stream.

In certain embodiments, the feed water stream includes a water phase and another immiscible or partially miscible fluid phase. The immiscible or partially miscible fluid phase includes one of a non-dissolved gas phase, an oil phase, or dispersed solid particles, in a proportion ranging from 1 ppm to 10% in volume. The method for producing the treated water stream is further used to separate the water and the another immiscible or partially miscible fluid phase.

According to various embodiments, the plurality of evaporators includes a low-pressure evaporator configured to operate between 0.01 and 0.2 barA (absolute pressure) (1 and 20 kPa), a medium-pressure evaporator configured to operate between 0.1 and 0.5 barA (10 and 50 kPa), and a high-pressure evaporator configured to operate above 0.4 barA (40 kPa).

According to other embodiments, a variation in the pressure levels of the plurality of evaporators is based on an amount of existing energy and a temperature at which the existing energy is available in the crude oil and natural gas production facilities.

BRIEF DESCRIPTION OF THE DRAWINGS

These and other features, aspects, and advantages of the invention are better understood with regard to the following Detailed Description, appended Claims, and accompanying Figures. It is to be noted, however, that the Figures illustrate only various embodiments of the invention and are therefore not to be considered limiting of the invention's scope as it may include other effective embodiments as well.

DETAILED DESCRIPTION

Figure 1:
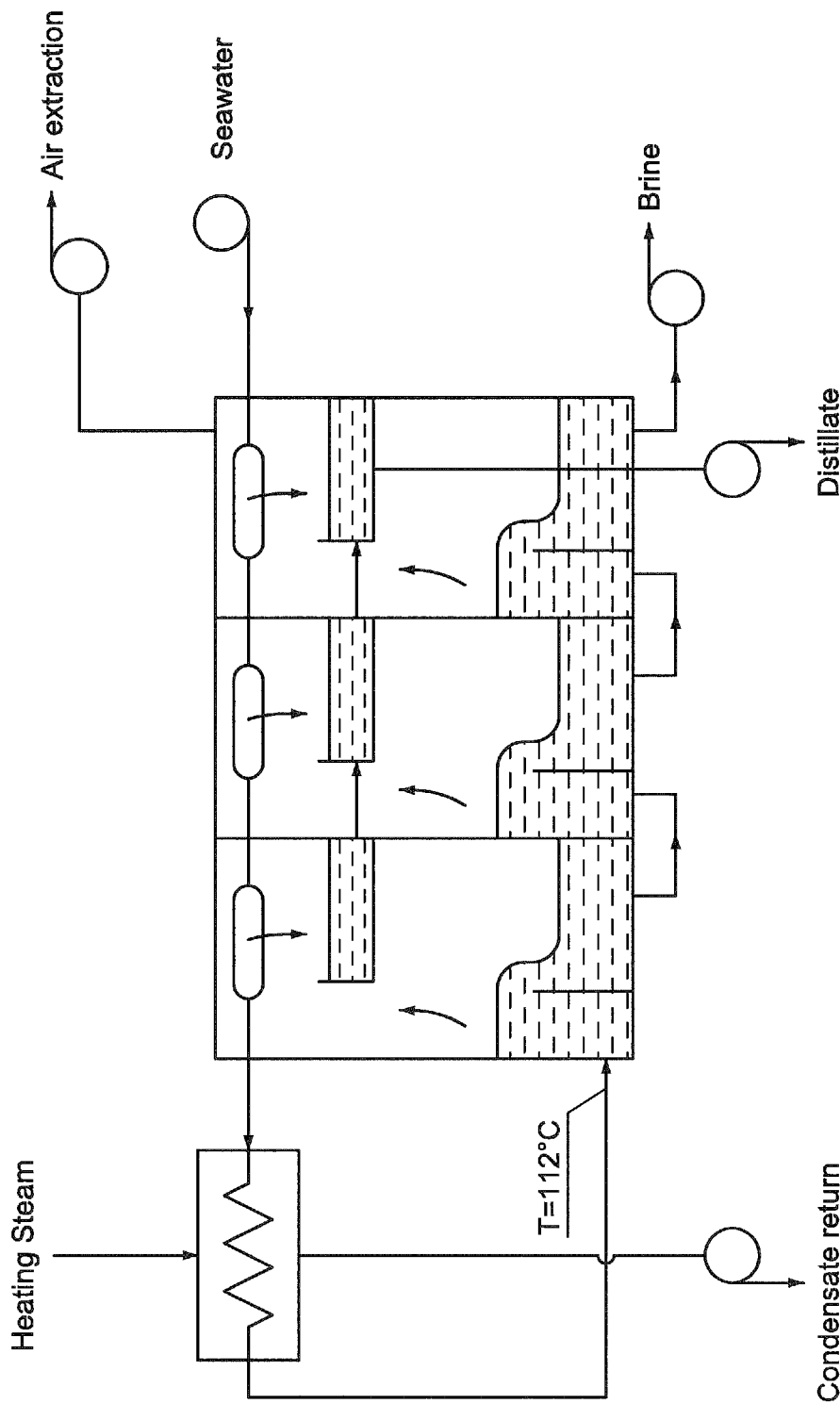
FIG. 1 is a schematic diagram of a conventional thermal desalination system.
Figure 2:
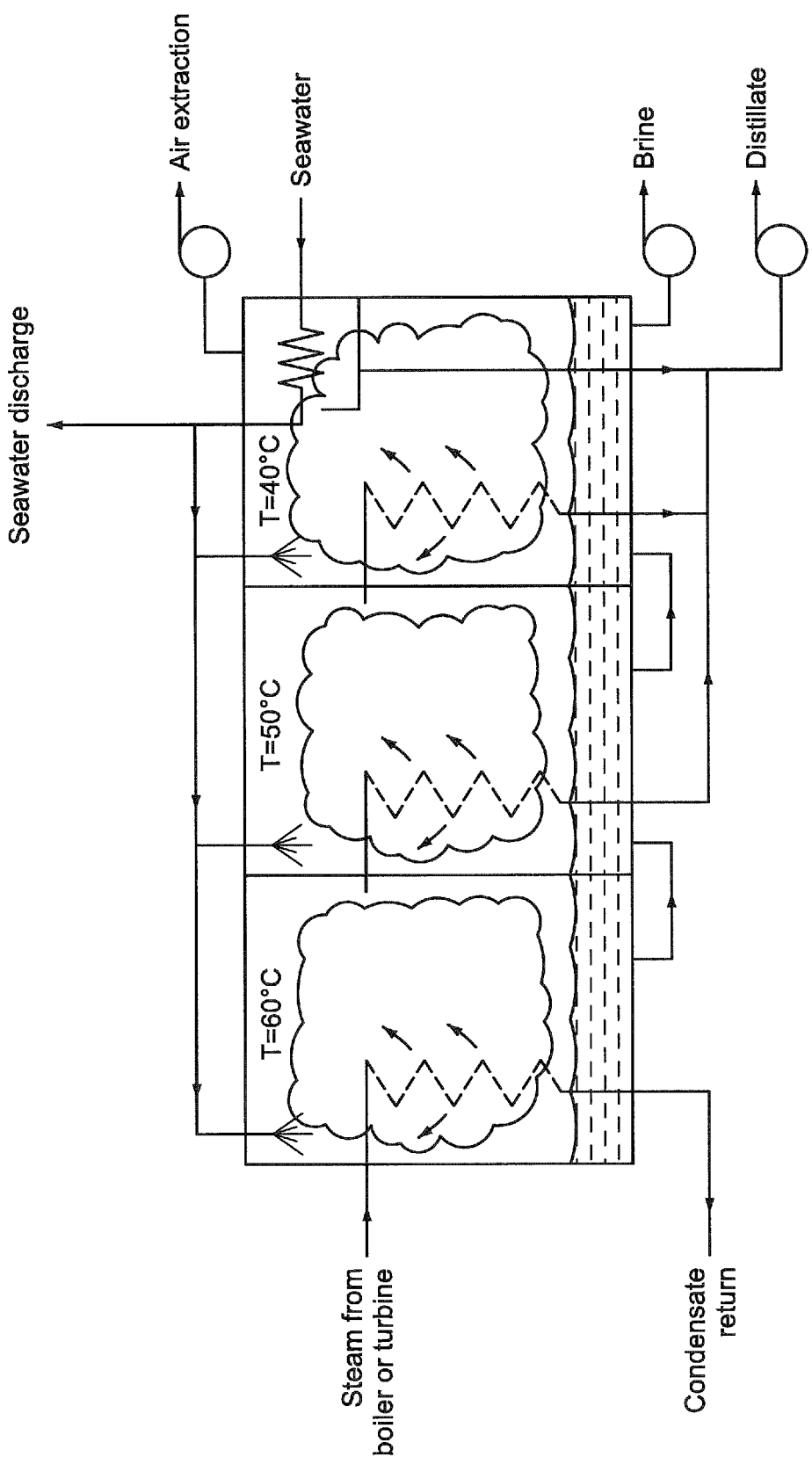
FIG. 2 is a schematic diagram of another conventional thermal desalination system.
Figure 3:
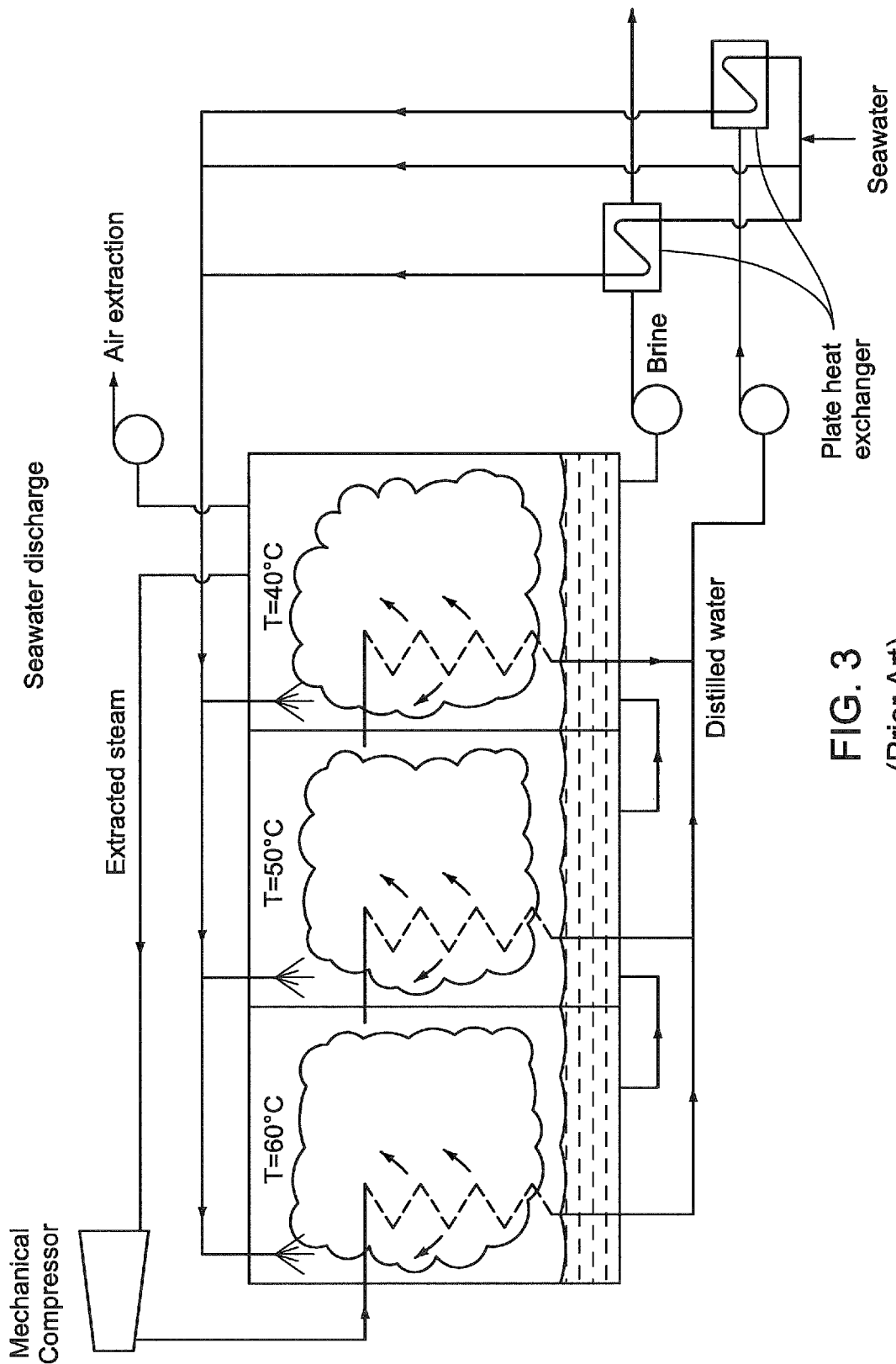
FIG. 3 is a schematic diagram of a third conventional thermal desalination system.

The present invention will now be described more fully hereinafter with reference to the accompanying drawings, which illustrate embodiments of the invention. This invention may, however, be embodied in many different forms and should not be construed as limited to the illustrated embodiments set forth herein. Rather, these embodiments are provided so that this disclosure will be thorough and complete, and will fully convey the scope of the invention to those skilled in the art. Like numbers refer to like elements throughout. Prime notation, if used, indicates similar elements in alternative embodiments.

The accompanying drawings illustrate various components of the embodiments of the invention, however, not all components (e.g., valves, pumps, vents, connectors, etc.) of the treated water production system, according to various embodiments, have been illustrated. One of ordinary skill in the relevant art would have understood that additional components may be required to connect the components discussed below for various embodiments and/or to optimize the processes or systems discussed herein.

As generally mentioned above, embodiments of the invention relate to systems and methods for the in-situ production of treated water from produced brine available at crude oil and natural gas production facilities. Various embodiments of the invention address problems associated with conventional thermal desalination systems and processes, by providing systems and methods that perform multiple-stage heating using the available heat in the GOSP facility at different temperatures. By using the heat available in the GOSP at different temperatures, exergy losses are minimized and the amount of external energy required for the process to produce desalinated water in-situ can be significantly reduced in existing oil and gas production facilities. According to certain embodiments, the energy capacity at a corresponding temperature level leads to a different optimized operation scheme in the GOSP facility.

As generally discussed above, in conventional desalination systems, salt water or seawater is fed to the highest temperature vessel (i.e., as in the multi-stage flash distillation system) or in parallel to different vessels (as in the multi-effect distillation system), while the brine is extracted from the lowest temperature/pressure vessel or chamber. In accordance with at least one embodiment, a multi-stage, in-series configuration is provided, in which the salt water is fed into the lowest temperature/pressure vessel and the brine is extracted from the highest temperature/pressure vessel, significantly differentiating it from conventional desalination schemes.

In accordance with one embodiment, the multi-stage, in-series configuration includes three levels of pressure, two below ambient pressure and one at ambient pressure. In accordance with some embodiments, there are three levels of pressure below ambient pressure, while in other embodiments, there are three levels of pressure above ambient pressure. The variation in pressure levels between various embodiments is based on the amount of energy available in the GOSP facility and the temperature at which the energy is available. In a preferred embodiment, the multi-stage, in-series configuration includes two levels of pressure, instead of three, when the difference between the highest available temperature and the lowest available temperature is small. In accordance with various embodiments, a level of pressure is provided every thirty (30) Kelvin temperature difference. In at least one embodiment, the lowest level of pressure is between 0.01 and 0.2 barA (1 and 20 kPa), the medium level of pressure is between 0.1 and 0.5 barA (10 and 50 kPa), and the highest level of pressure is above 0.4 barA (40 kPa). However, in accordance with other embodiments, the presence of additional energy (i.e., both internally and externally) and a higher GOSP operating pressure can alter the aforementioned pressure windows.

In accordance with certain embodiments, the use of produced water and a produced water heat exchanger is also based on the energy availability in the GOSP facility Making use of the produced water as a source of energy reduces the requirement for external energy sources.

In some embodiments, significant heat capacity (i.e., amount of heat) is available at specific temperatures (i.e., during a phase change) at temperature differences smaller than 30 Kelvin. In accordance with these embodiments, the configuration of the system includes one processing stage for each temperature level to minimize exergy losses.

In at least one other embodiment, there is provided a multi-stage, in parallel configuration, in which the produced water is fed to vessels or chambers in parallel after pre-conditioning the produced water through internal heat exchangers in order to maximize the energy recovery in the GOSP facility. Furthermore, the brine is also extracted from the high-pressure vessel or compartment.

The methods and systems, according to certain embodiments, are utilized in conjunction with any site or industrial facility where treated water production using heat or waste heat from brine or gray water is of interest. The methods and systems described herein can also be used for seawater desalination in some applications, such as the in-situ production of treated sweet water at an off-shore platform. According to other embodiments, the methods and systems discussed herein are used in industry where any existing water waste stream essentially allows water to evaporate in large amounts compared to other volatile organic components in the mixture. Depending on the application and the water feed composition, the quality of the generated treated water is impacted, especially when dissolved gases or low boiling point components are present in the feed mixture.

Various embodiments provide methods that use and systems that include static equipment with no moving parts, and pumps which are common equipment in all water desalination processes, and therefore eliminate the high maintenance costs needed to maintain the moving parts of vapor compression desalination systems.

In most cases, conventional thermal desalination systems use a single energy source at the highest operating temperature. Whereas, in accordance with various embodiments, different energy sources at different temperatures are used, decreasing the total energy consumption in the system, thus providing advantageous performance and reliability over conventional thermal desalination systems.

Conventional thermal water desalination techniques fail to consider the problem of handling dissolved hydrocarbons contained in the feed water as these techniques essentially focus on desalinating seawater. This point can become an issue in the case of produced water treatment at hydrocarbon production facilities, since the feed water contains up to a few percent in volume of hydrocarbons. Similarly, conventional thermal desalination systems do not consider the problem of handling $CO_2$ and $H_2S$ contained in the feed water. This point can become an issue in the case of produced water treatment at hydrocarbon facilities, since the feed water may be contaminated with dissolved $CO_2$, $H_2S$ and other acid gases.

Heating and depressurization of such feed water in conventional thermal desalination processes generate free hydrocarbon gas that accumulates in some areas of the desalination facility with potentially hazardous consequences and a detrimental effect on the process or system. Conventional thermal desalination systems and processes may also include evolving free $CO_2$, $H_2S$, and other acidic gases that are toxic and corrosive to the environment and workers at the GOSP facility.

Various embodiments provide a method and an integrated system capable of handling free hydrocarbon gas. Accumulation of free gas is avoided by means of continuous fluid circulation. Additionally, multi-stage vaporization from the lowest temperature stage to the highest temperature stage limits the generation of large amounts of gaseous hydrocarbons in each vessel, keeping the gaseous hydrocarbons under a concentration of 1.1% in volume, that is to say under their lower threshold of flammability in every stage of the process, even if the initial hydrocarbon volume content of the gaseous hydrocarbon in the initial feed is up to 4% in volume. Furthermore, the methods and systems, according to certain embodiments, allow for generated gaseous hydrocarbons to be condensed and mixed with a treated water stream exiting the system, eliminating the risk of buildup of hazardous gases concentration.

Various embodiments also provide a method and an integrated system capable of handling toxic and corrosive gases dissolved in the feed water. Similarly to hydrocarbon gases, the accumulation of free gas is avoided in the system by means of continuous fluid circulation. Depending on the industrial application of the process, these gases can be removed from the system by means of a known separation technique, for example, a membrane separation.

Various embodiments also eliminate the need for furnaces and burners to heat the feed water, as normally is required for conventional thermal desalination systems. Accordingly, these embodiments provide a flameless thermal desalination system that takes into account safety requirements of the hydrocarbon production industry for the explosive and flammable environment of classified hydrocarbon production plants.

Figure 4:
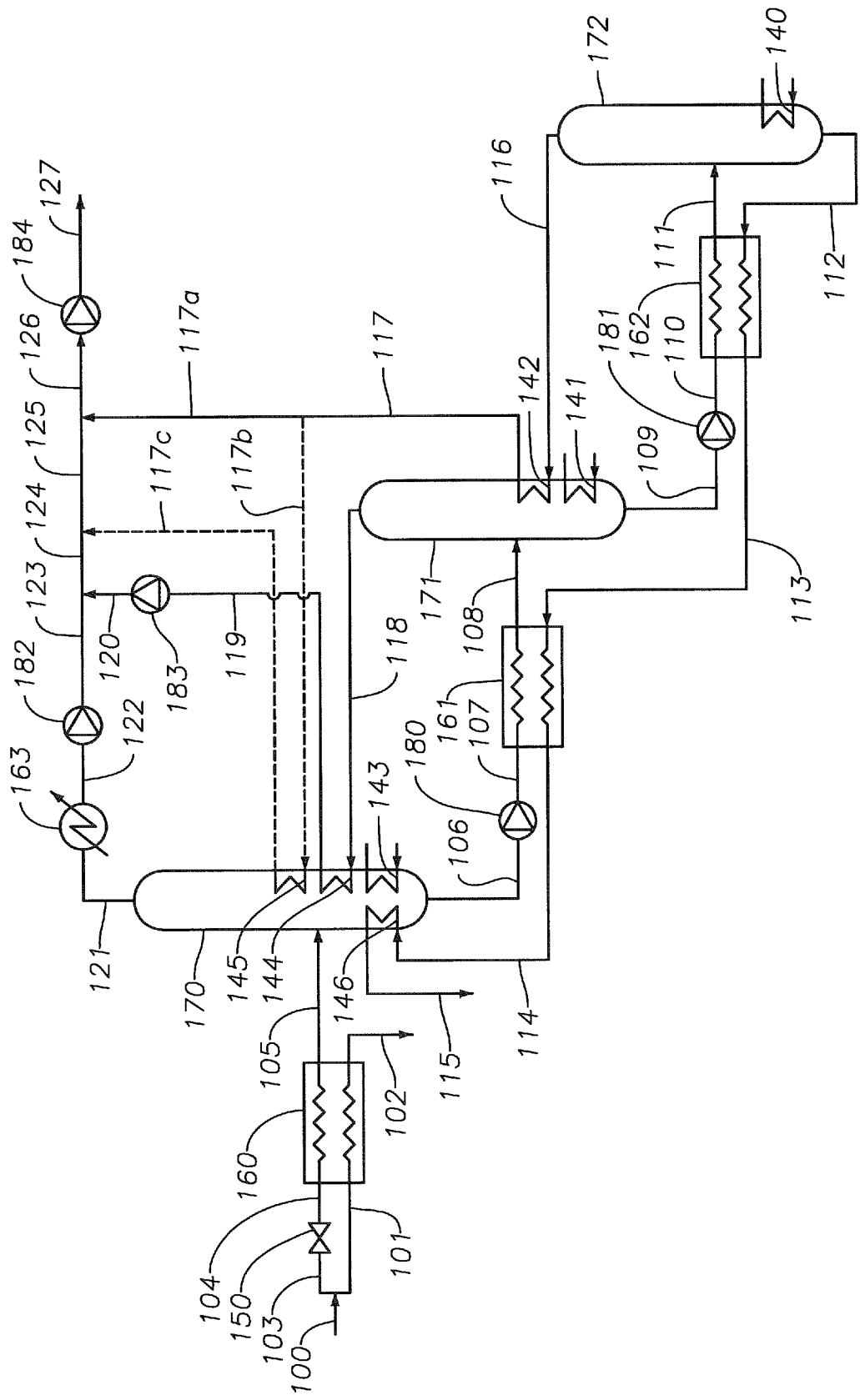
FIG. 4 is a schematic diagram of a multistage, in-series water treatment system, in accordance with an embodiment of the invention.

In accordance with certain embodiments, there is provided a system, as shown in FIG. 4, for producing treated water from produced brine available at crude oil and natural gas production facilities. The system includes multiple evaporation/condensation stages combined in series (hereinafter referred to as a "multistage-in-series configuration").

The multi-stage, in-series configuration includes a produced water main stream 100 (produced at a much higher rate than the required fresh water or treated water for desalination purposes), as shown in FIG. 4, which is split into a heating stream 101, which is used for heating purposes, and a produced water stream 103, which is used for the generation of treated water.

The produced water stream 103 is expanded, using a pressure expander 150, from its initial pressure $P_0$ to a low operating pressure $P_1$ of the system. The different pressure levels used to discuss the systems and related methods, according to various embodiments, are determined based on the available energy temperature in the system, so as to maximize the use of the high temperature level energy from the GOSP. Representative operating parameters will be discussed below for a specific GOSP configuration; however, one of ordinary skill in the relevant art would have understood that these values represent only one operating scheme, and that the values differ when applied in a different GOSP.

The produced water stream 103, heading for desalting, is expanded, for example, to about 0.1 barA (10 kPa) before entering a produced water heat exchanger 160 to exchange with the heating stream 101. The low-pressure stream 104, exiting the pressure expander 150, has, for example, a saturation temperature around 50° C., and thus can be heated by the heating stream 101 entering the heat exchanger 160 at, for example, 54° C., the initial temperature of the produced water main stream 100, to start steam production.

As further shown in FIG. 4, the heating stream 101 is cooled in heat exchanger 160 and is conveyed out of the process in a produced water stream 102. Exiting the cold side of the heat exchanger 160, a heated stream 105 enters a low-pressure vessel 170 for water vapor generation and liquid/vapor separation. The low-pressure vessel 170, as discussed herein for various embodiments, can be a distinct vessel or a compartment or chamber in a larger vessel. One of ordinary skill in the relevant art would have understood that the low-pressure vessel 170 could be any conventional type of vessel that is capable of performing the functions discussed below.

The produced water in low-pressure vessel 170 is heated by different means using internal heat sources and GOSP heat sources to produce a water vapor stream 121 that leaves the low-pressure vessel 170 and is cooled by a condenser 163. The condenser 163 condenses the produced water in the stream 122, which is then conveyed to a stream 123 of a treated water collection line 126, after its compression by a pump 182. The condenser 163 can be physically arranged outside the low-pressure vessel 170 or inside it. The condenser 163 cold sink could include air, water, seawater or any available low temperature heat sink.

The heat exchangers shown in FIG. 4 include heat exchangers 143, 144, 145 and 146. In accordance with various embodiments, heat exchanger 143 is an external heat exchanger that is used to exchange GOSP low temperature energy, for example, between 75° C. and 53° C., to evaporate water and to generate steam. The available heat from the GOSP dictates the heat duty of heat exchanger 143, and thus affects the production of steam at this level. Indeed, the saturation temperature and pressure of the low-pressure stage of the process will be determined to generate the required amount of steam by calculating the amount of energy available from the GOSP at that level of temperature, as will be discussed in more detail below. Heat exchangers 144, 145 and 146 heat the produced water in order to generate water vapor in the low-pressure vessel 170, as will be discussed in more detail below.

The low temperature, low-pressure, liquid-produced water is extracted from the bottom of the low-pressure vessel 170 by a brine stream 106 and compressed by a brine collector line pump 180 to a medium-pressure level before entering in a stream 107 and exiting a heat exchanger 161 in a stream 108 to finally enter a medium-pressure vessel 171.

As further shown in FIG. 4, the heat exchanger 161 is an internal heat exchanger that uses the heat available in the brine (produced water exiting a high-pressure vessel 172 in a brine stream 112, as will be discussed in more detail below) to heat the produced water before its entry to the medium-pressure vessel 171 through the stream 108.

In accordance with various embodiments, the medium-pressure is around 0.35 barA and the saturation temperature is around, for example, 75° C. The produced water in the medium-pressure vessel 171 is heated by one or more heat exchangers, for example, heat exchangers 141 and 142 to generate water vapor that leaves the medium-pressure vessel 171 in the stream 118.

The heat exchanger 141 is an external heat exchanger that draws its energy from the GOSP's medium temperature energy, for example, between 105° C. and 75° C., and provides the energy to the produced water in the medium-pressure vessel 171 to generate steam. In accordance with various embodiments, the medium stage saturation temperature and pressure are calculated based on the available energy at the GOSP at this level of temperature.

In accordance with various embodiments, the concentrated produced water leaves the medium-pressure vessel 171 by a stream 109 to be compressed to a high-pressure before entering a heat exchanger 162 and exits the heat exchanger 162 in a stream 111 to subsequently enter the high-pressure vessel 172. The high-pressure saturation temperature and pressure are, for example, 102° C. and 1 barA, respectively. One of ordinary skill in the relevant art would understand that the notion of "low," "medium," and "high," as used to describe various embodiments of the low-pressure vessel 170, the medium-pressure vessel 171, and the high-pressure vessel 172, respectively, and their operating parameters, are relative terms and not absolute.

The heat exchanger 140 is used to provide the necessary energy to heat the concentrated produced water and to generate more steam that leaves the high-pressure vessel 172 in a generated steam stream 116. The heat exchanger 140 is operated by the waste heat or energy available in the GOSP at temperatures above, for example, 105° C. In accordance with at least one embodiment, the heat exchanger 140 is the only heat exchanger that drives the vapor generation in the high-pressure vessel 172.

In accordance with various embodiments, as long as steam is generated in the high-pressure vessel 172, the concentrated produced water becomes more concentrated and is now considered to be brine. The brine solution leaves the high-pressure vessel 172 in the brine stream 112 at a high temperature and pressure and can provide internally-generated energy to the system, therefore saving energy and eliminating the need for external energy sources.

The brine stream 112 enters the hot side of the heat exchanger 162 to heat the concentrated produced water conveyed from the medium-pressure stage to the high-pressure stage. A brine stream 113 leaves the heat exchanger 162 to enter a hot side of the heat exchanger 161 and heats the concentrated produced water conveyed from the low-pressure stage to the medium-pressure stage. A brine stream 114 leaves the heat exchanger 161 to enter the heat exchanger 146 in the low-pressure vessel 170 and exchanges heat to heat the produced water and to generate some steam before it is conveyed out of the system in a stream 115.

As further shown in FIG. 4, the generated steam in the medium-pressure vessel 171 operating at the medium-pressure is conveyed through the stream 118 to the heat exchanger 144 in the low-pressure vessel 170. Since the low-pressure vessel 170 is working at a lower pressure and temperature, the stream 118 completely condenses in the heat exchanger 144, allowing more steam to be generated in the low-pressure vessel 170, and exits as treated water in a stream 119. The stream 119 is then compressed by a pump 183 to a desired pressure and then directed through a stream 120 to a stream 124 of the treated water collection line 126.

The generated steam stream 116 leaves the high-pressure vessel 172 to enter the heat exchanger 142 in the medium-pressure vessel 171. The operating temperature and pressure of the medium-pressure vessel 171 make the steam in the generated steam stream 116 condense in the heat exchanger 142, allowing for more steam generation in the medium-pressure vessel 171. The condensed treated water leaves the heat exchanger 142 in a stream 117 and heads towards the treated water collection line via a stream 117a, in accordance with at least one embodiment.

However, since the treated water condensed in the heat exchanger 142 is still at a higher temperature than the low-pressure vessel 170 temperature, the stream 117 could be conveyed to the heat exchanger 145 in the low-pressure vessel 170 by a stream 117b, and then forwarded through a stream 117c to a stream 125 of the treated water collection line 126.

In accordance with certain embodiments, the use (or non-use) of this path and the heat exchanger 145 is dictated by economics. According to at least one embodiment, the heat exchanger 145 is excluded, since its heat duty is small. Thus, in this embodiment, it is not economically viable to install it and maintain it, as the available heat will be transferred later on to the crude in a desalter vessel (not shown), and therefore will not be wasted.

As further shown in FIG. 4, a pump 184 collects the treated water from the treated water collection line 126 and compresses it and/or conveys it through a treated water stream 127 to a desired pressure and application, for example, oil desalting. The pump 184 is needed when the pressure in the treated water collection line 126 is lower that the delivery pressure needed for use of the treated water.

In accordance with various embodiments, a determination of whether pumps 182 and 183 are needed in the system is based on the pressure levels and the presence or absence of the pump 184. It should be noted, that for illustrative purposes, the embodiments discussed herein, as shown in FIG. 4, are at atmospheric pressures at the high-pressure stage to reduce the volume of the equipment and minimize water compression. A preferred configuration for the system includes one pump, for example, the pump 184, to recover the condensed treated water and compress it to the required pressure, thus minimizing the number of required pumps.

In accordance with various embodiments, the system architecture and configuration and the number of successive stages is based on the amount of energy and temperature at which this energy is available in the GOSP. In accordance with some embodiments, the energy available from the gas compressors discharge is sufficient to feed the heat exchangers 140, 141 and 143 with the desired heat at the desired level of temperature, enabling the system to generate the required amount of steam to produce the desired amount of treated water for a particular application. The external thermal energy input needed is, in the case of some embodiments, zero and the only external energy input required is the electric energy to drive the pumps in the system. Accordingly, the total power consumption would be, for example, less than 0.2 kWh/m$^3$ of produced treated water.

In an alternative embodiment, it is possible to replace the mechanical compression (e.g., motor or turbine driven pumps) with thermal compression and/or ejectors, when different sources of energy, for example, heat, steam, pressure or hydraulic power are available on site or when electricity is not provided. Doing so would allow designing a system without a requirement for an external source of electric energy, thus saving the power consumption of 0.2 kWh/m$^3$ of produced treated water, but this would be at the expense of complicating the design of the system.

In an embodiment where the available energy in the GOSP is sufficient to produce the desired amount of steam in the high-pressure stage through heat exchanger 140, only one stage would then be necessary and operating the process would still be less costly than any commercially available desalination technology.

In accordance with some embodiments, the heat exchanger 160 may, or may not, be incorporated into the process, depending on the availability of energy in the GOSP. If for example, the energy available from the gas compressors discharge is sufficient to produce the desired treated water, the heat exchanger 160 is not needed. However, if the energy is insufficient to produce the desired treated water, the use of the heat exchanger 160 may be beneficial. In accordance with at least one embodiment, a vapor-compression cycle is incorporated into the process to supplement the energy needed to produce the desired treated water.

It is usually preferred to avoid the use of the crude oil thermal energy in order to keep its temperature as high as possible, which is helpful for the separation of brine from crude oil. One of the benefits of the systems and processes, according to various embodiments, is that it can provide treated water at a relatively high temperature, or at least at a temperature equal to the crude temperature, which is beneficial to decrease the stability of the water-crude oil emulsions sometimes formed at the GOSP, thus facilitating the emulsion separation and increasing the separation and desalting performance of the GOSP facility.

However, if in any case, the recoverable energy from the GOSP is not sufficient, the supplement of thermal energy can be provided easily by a flare, a component readily available in most GOSPs, and/or combustion, and/or renewable energy, and/or electrical energy for direct heating, and/or heat pump, and/or compressed vapor desalination loop integrated in one or several vessels.

In accordance with some embodiments, the produced water fed to the system can be provided from different locations in the GOSP, upstream of the water oil separator (WOSEP) or downstream of the WOSEP. Taking the brine at a higher temperature in the plant will lower the energy amount needed for desalination. However, due to partial oil/water separation in the initial stages of the GOSP, this will generally imply higher oil content in the feed water.

The system, according to various embodiments, processes brines with a low percentage of oil and dissolved gases, for example, up to approximately 4% in volume, without any prior brine treatment. As will be discussed in more detail below, the vaporized oil in the different stages of the system is then condensed and routed out of the system and mixed with the treated water stream. The oil recovery rate in the treatment process for this system is around 35% and is based on the initial oil content and system operating temperatures. This can be advantageous in some applications of the system or process, according to certain embodiments where the treated water is to be re-used in a dehydrator or desalter vessel for the purpose of crude oil desalting, because the recovered oil is brought back to the main oil production stream. The gained advantage can be quantified either in terms of added hydrocarbon production or in terms of a net positive contribution to the energy balance of the process according to various embodiments of the invention.

However, in applications where the treated water is not intended for desalting purposes and a low or zero oil content is required, it will be necessary to complement the system, according to some embodiments, with a classical water/oil separation technology, or with a membrane for separating oil vapors and steam as mentioned above, or it would be best to use produced water from the WOSEP to feed the system.

The detailed geometrical configuration of the system, according to various embodiments, can be designed in such a way to avoid high points where hydrocarbon gases can accumulate. For a safe and easy operation of the system, the vents or degassing devices in the system would be used during startup phases or when air had infiltrated into the system.

Commercially available vents or degassing devices can be used at each vessel in the system to remove non-condensable (or undesired gases) and provide a stable operation of the process with constant water quality output. When working below ambient pressure, though, the degassing scheme should consider compressing the vented gases to purge them out of the system. Displacement techniques can also be used to purge the non-condensable gases out of the system or adsorption and/or absorption techniques or any suitable technologies (i.e., suitable technologies including any commercial technology that can remove non-condensable gases out of a gaseous stream, such as adsorption using a molecular sieve for organic volatiles).

Figure 5:
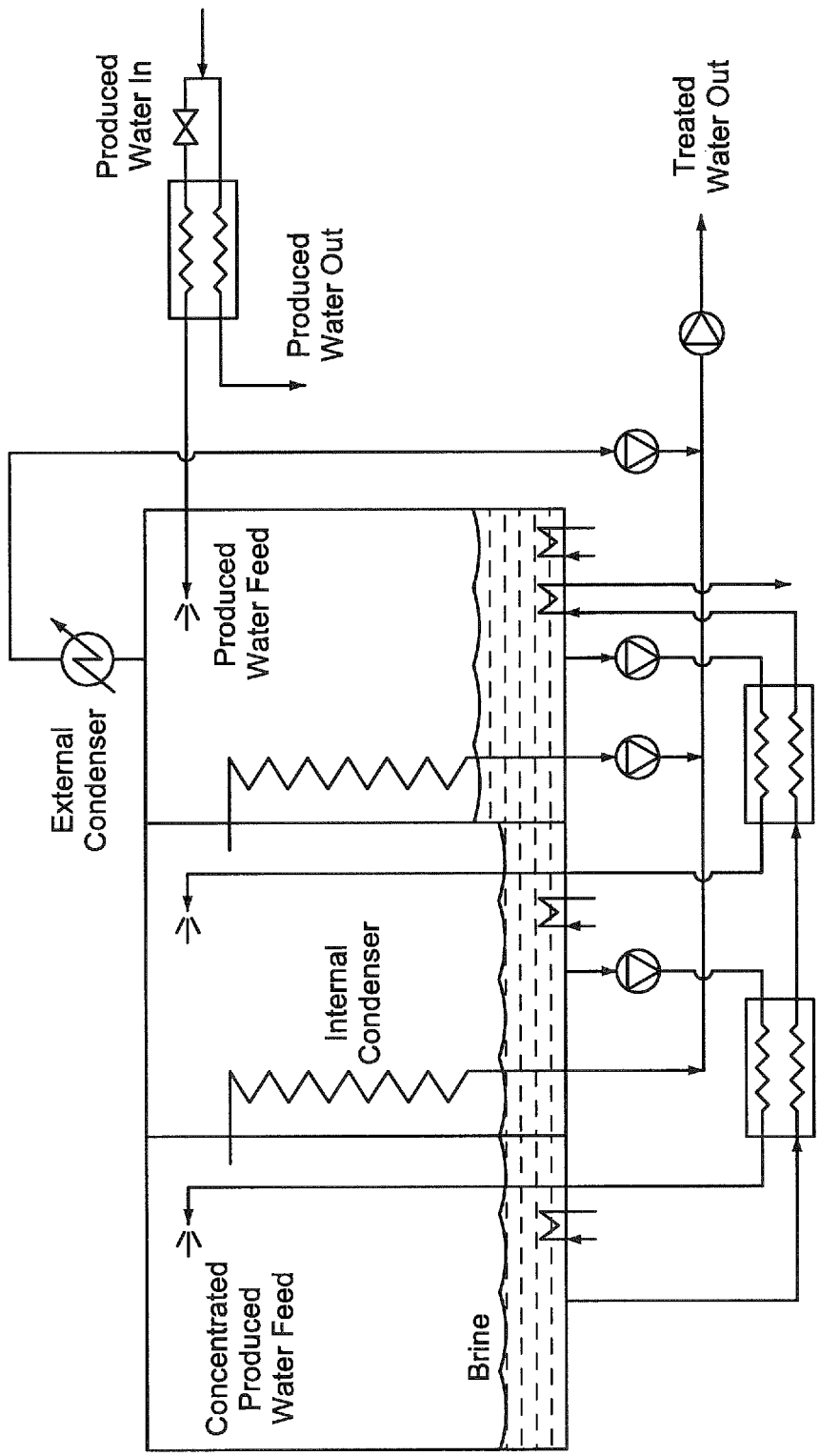
FIG. 5 is a schematic diagram of an integrated water treatment system, incorporating the multistage, in-series water treatment system, as shown in FIG. 4, in accordance with an embodiment of the invention.

FIG. 5 shows a schematic diagram of an integrated scheme for the multi-stage-in-series configuration illustrated in FIG. 4, in accordance with an embodiment of the invention. As shown in FIG. 5, the system shown in FIG. 4 can be integrated in a vessel divided into compartments and can make use of equipment available on the market for multi-stage flash or multiple-effect distillation processes for water desalination.

Figure 6:
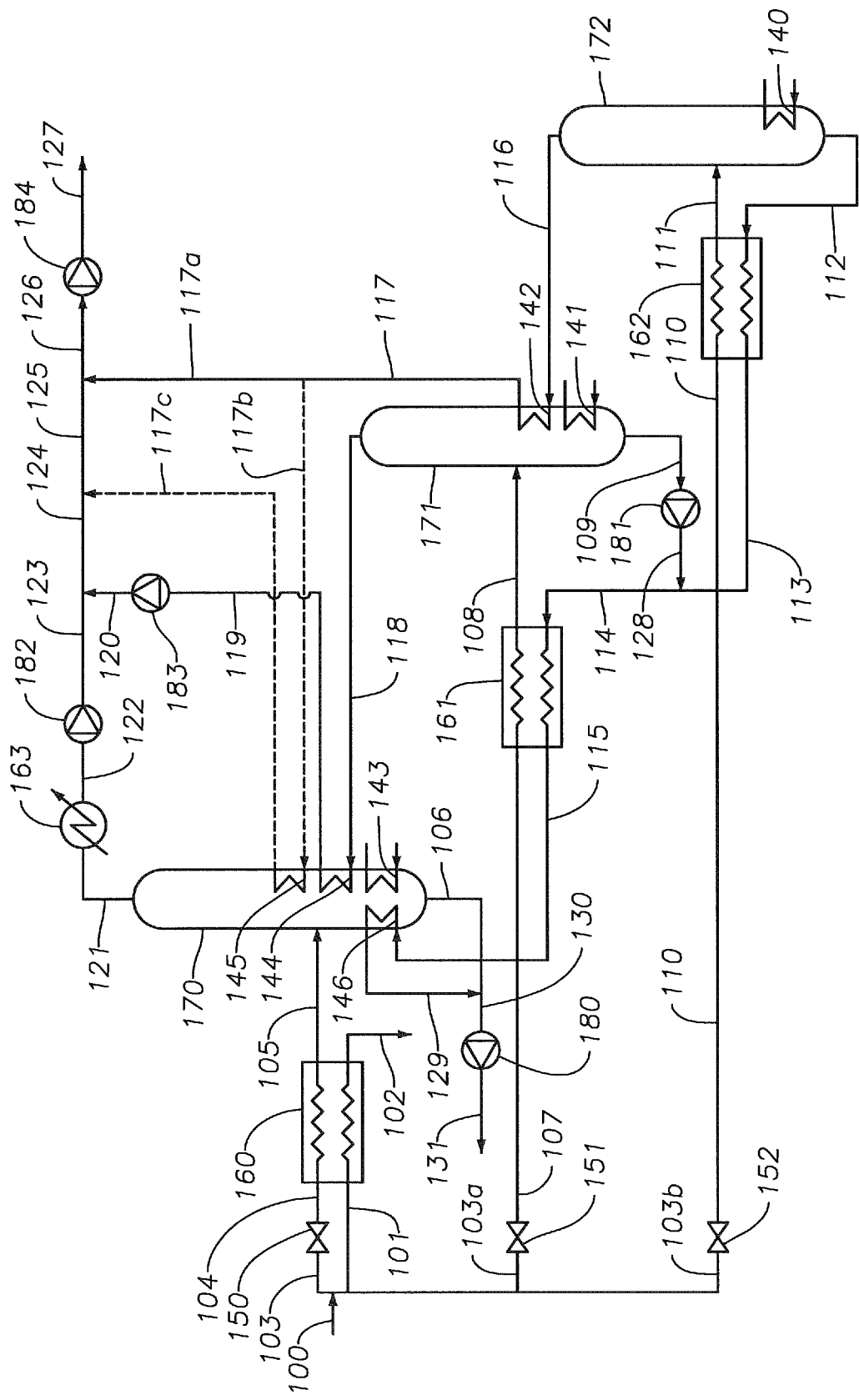
FIG. 6 is a schematic diagram of a multistage, in-parallel water treatment system, in accordance with an embodiment of the invention.

FIG. 6 shows a schematic diagram of a multistage, in-parallel water treatment system, in accordance with an embodiment of the invention. As shown in FIG. 6, the produced water main stream 100 is split into 4 streams: the heating stream 101, the produced water stream 103, a first parallel produced water stream 103a, and a second parallel produced water stream 103b. The configuration of the heating stream 101, the low-pressure stream 104, and the produced water heat exchanger 160 and its operation scheme are unchanged, and therefore the description of these elements discussed above for FIG. 4 is the same for these embodiments.

As similarly discussed above for FIG. 4, the produced water stream 103 is expanded, using the pressure expander 150. The low-pressure stream 104 is heated in the heat exchanger 160 and exits in the heated stream 105, which subsequently enters the low-pressure vessel 170. On the hot side of the heat exchanger 160, the heating stream 101 is cooled and exits the system in the produced water stream 102.

According to some embodiments, energy is transferred to the fluid in the low-pressure vessel 170 via the heat exchanger 143, 144, 146, and in some embodiments via the supplementary heat exchanger 145. The heat exchanger 143 is an external heat exchanger working on the GOSP low temperature energy on its hot side.

The heat provided to the low-pressure vessel 170 allows the evaporation of a water vapor stream that exits the low-pressure vessel 170 in the water vapor stream 121 to be conveyed to the condenser 163 operated by air, water or seawater. According to various embodiments, the condenser 163 is arranged either inside or outside the low-pressure vessel 170.

The condensed stream exiting the condenser 163, which is designated as treated water, is compressed by the pump 182 and then conveyed to a stream 123 of a treated water collection line 126.

As shown in FIG. 6, the concentrated solution of produced water is extracted from low-pressure vessel 170 in the brine stream 106 using the brine collector line pump 180.

The first parallel produced water stream 103a is expanded to a medium-pressure value in an expansion device 151 and conveyed in stream 107 to heat exchanger 161, where it is heated before entering the medium-pressure vessel 171 through the stream 108.

The medium-pressure vessel 171 is heated by the heat exchangers 141 and 142. The heat exchanger 141 is an external heat exchanger that gets its duty from the GOSP energy. Heating the produced water in the medium-pressure vessel 171 generates water vapor that leaves the medium-pressure vessel 171 through the stream 118.

The stream 118 is conveyed to the heat exchanger 144 inside the low-pressure vessel 170, where temperature and pressure conditions allow it to condense and provide energy for steam generation in the low-pressure vessel 170. The stream 118 exits the heat exchanger 144 through the stream 119, compressed by a pump 183 to a desired pressure, and then directed through a stream 120 to a stream 124 of the treated water collection line 126.

The second parallel produced water stream 103b is expanded in an expansion device 152 to a high-pressure value and conveyed through stream 110 into the heat exchanger 162, where it is heated before entering vessel high-pressure vessel 172 through the stream 111.

The high-pressure vessel 172 is heated by the heat exchanger 140 that is operated by a high temperature heat duty from the GOSP. The steam generated in the high-pressure vessel 172 is conveyed out of the high-pressure vessel 172 by the generated steam stream 116 to feed the heat exchanger 142 in medium-pressure vessel 171, where it condenses and provides energy to evaporate more steam in the medium-pressure vessel 171.

The generated steam stream 116 exits the heat exchanger 142 through the stream 117 that can be either conveyed to the treated water collection line via the stream 117a or to the heat exchanger 145 in the low-pressure vessel 170 via the stream 117b for more cooling and then to the treated water collection line via the stream 117c.

The high-pressure and temperature brine exits the high-pressure vessel 172 through the brine stream 112 to feed the hot side of the heat exchanger 162, where it is cooled and exits via the brine stream 113 to join the medium-pressure brine stream exiting the medium-pressure vessel 171 via the stream 109 and compressed by the pump 181.

The merging of the brine stream 113 and a stream 128 exiting the pump 181 produces the brine stream 114 that enters the heat exchanger 161 hot side and then is conveyed to the heat exchanger 146 in the low-pressure vessel 170 for more cooling, thus providing more heat to generate steam at the low-pressure vessel 170. The brine exiting the vessel via a stream 129 joins the brine stream 106 exiting the low-pressure vessel 170, before a combined brine stream 130 is compressed to a desired brine collector pressure in the brine collector line pump 180 and exits the system via a stream 131.

Figure 7:
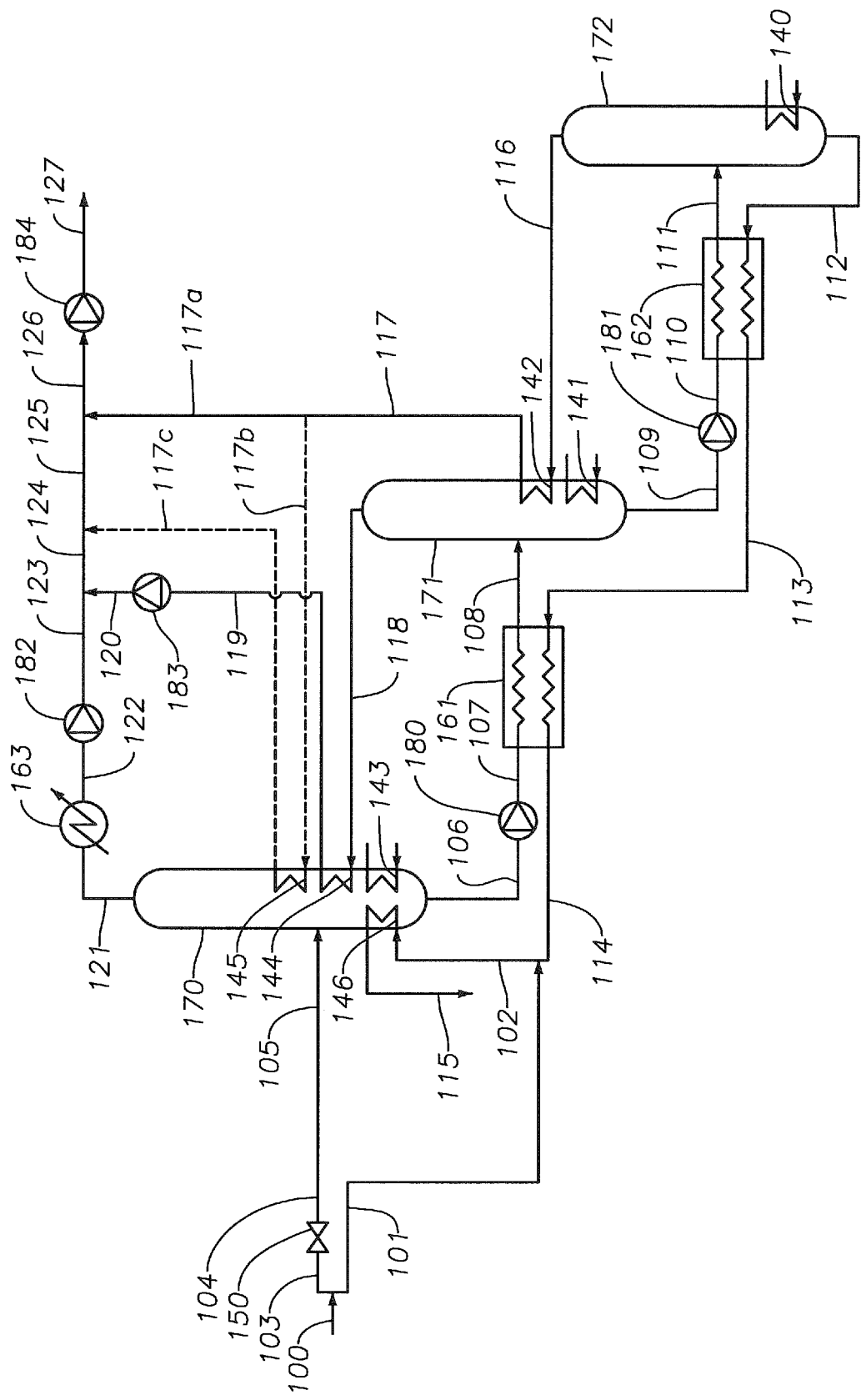
FIG. 7 is a schematic diagram of a hybrid water treatment system, in accordance with an embodiment of the invention.

In accordance with an alternative embodiment, the heat exchanger 160, in the multi-stage, in-series and multi-stage, in-parallel configurations, can be merged with the heat exchanger 146 to save on equipment and connections resulting in a "hybrid" configuration. FIG. 7 shows a schematic diagram of such a hybrid water treatment system, in accordance with an embodiment of the invention. Though the heat exchanger 160 is not always needed, "hybrid" configurations may have operational advantages in some applications when heat exchanger 160 duty is required in the process. The "hybrid" configuration option saves a heat exchanger with all the connections and maintenance that are associated with it.

FIG. 7 further shows that the low-pressure stream 104 is connected to the heated stream 105 and directly enters the low-pressure vessel 170. On the other hand, the higher pressure produced water in the heating stream 101 is merged with the fluid flow from the brine stream 114 to enter the heat exchanger 146 through the produced water stream 102 and to exit the system in the stream 115.

According to various embodiments, based on the pressure difference between the produced water inlet stream, for example, in the heating stream 101, and the fluid flow, for example, in the brine stream 114, a pressure regulator, for example an expansion or compression regulator, or an injector is used to blend the two streams before entering the heat exchanger 146 through the produced water stream 102.

Other "hybrid" configurations are contemplated according to various embodiments of the invention that incorporate evaporation and condensation stages operating at different pressures and temperatures to minimize the external energy required to generate the desired treated water within GOSP facilities.

Figure 8A:
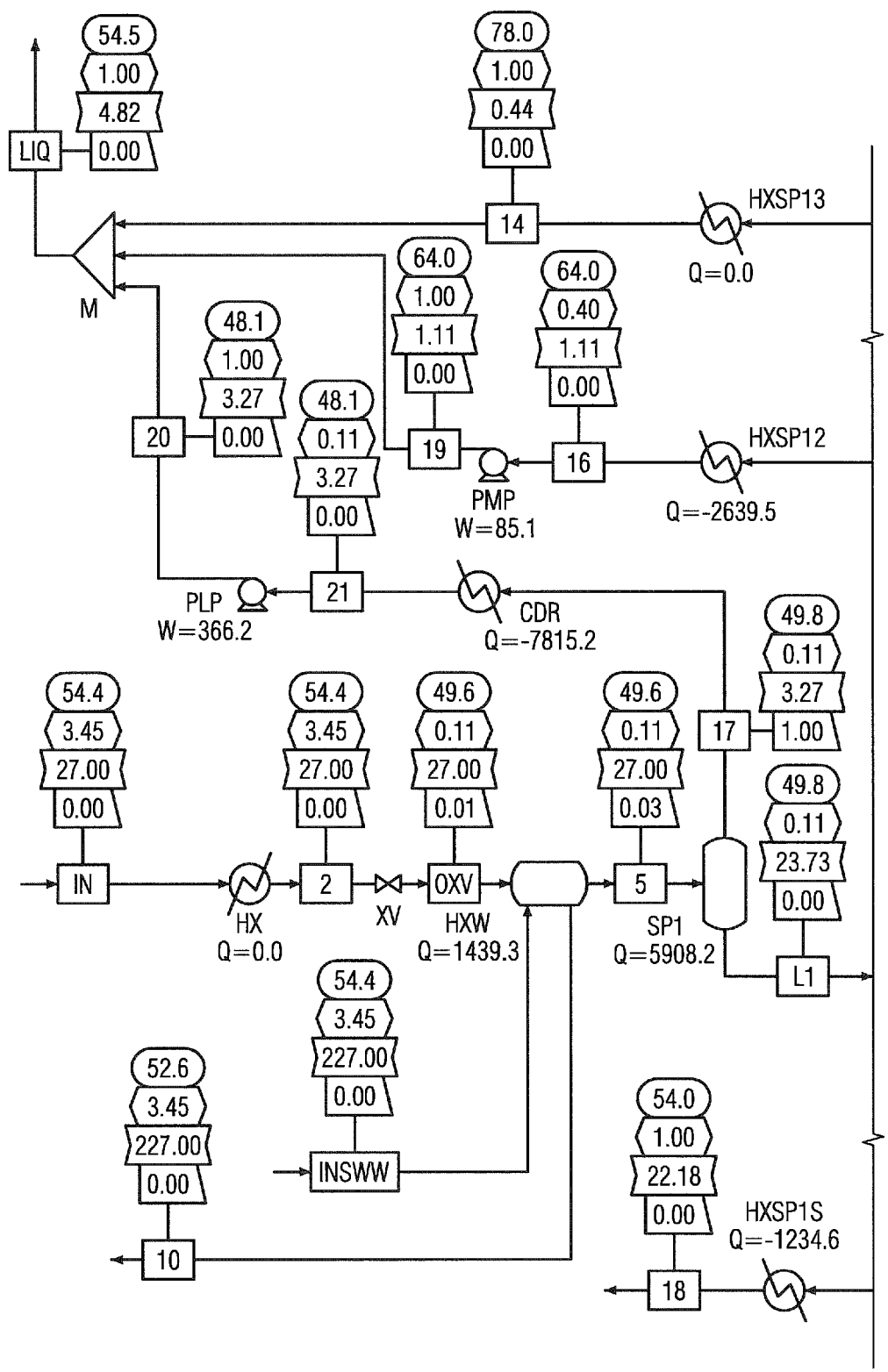
FIGS. 8a and 8b are schematic process diagrams of the multistage, in-series water treatment system, as shown in FIG. 4, without a hydrocarbons content, in accordance with an embodiment of the invention.
Figure 8B:
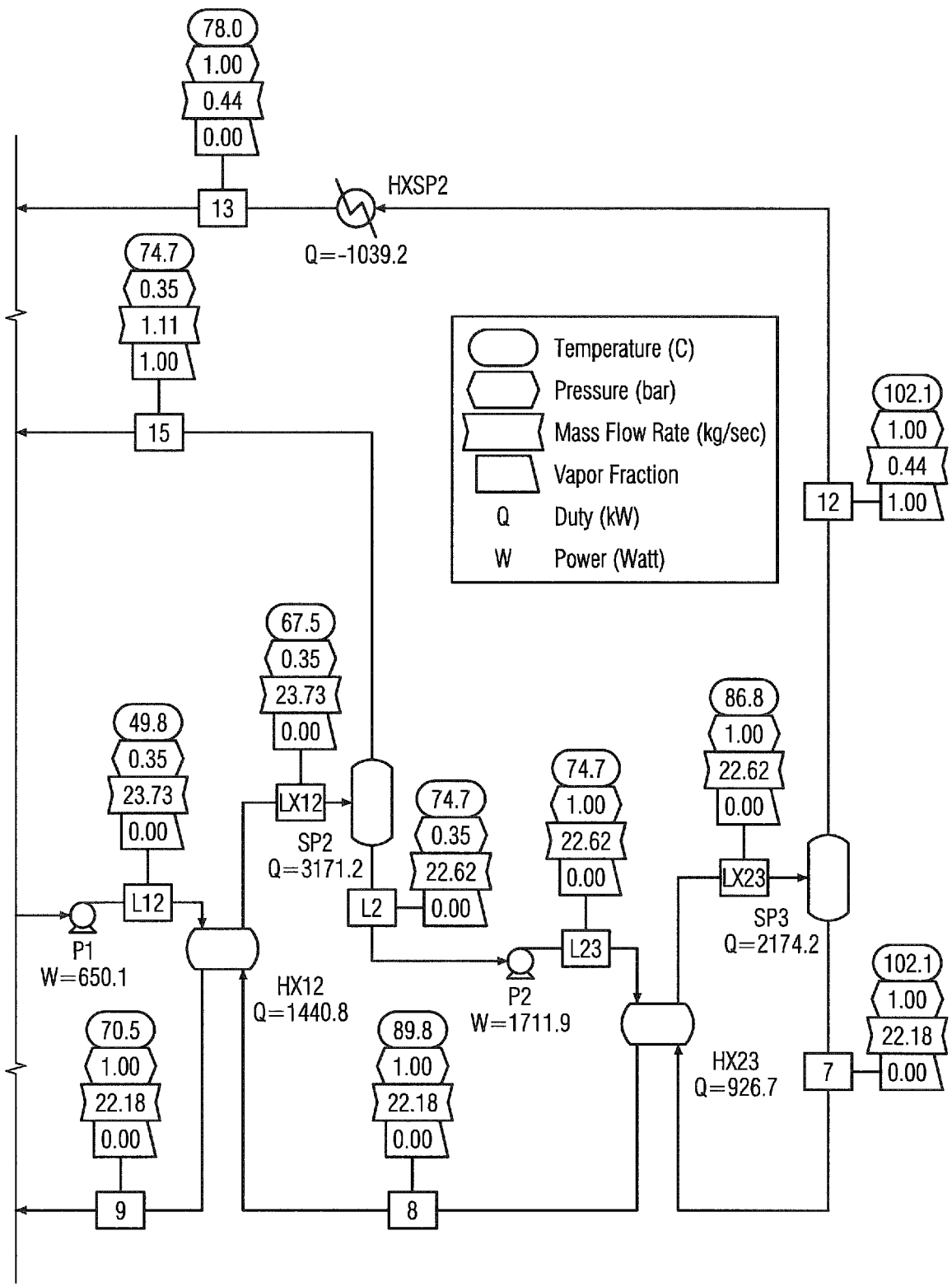
Figure 9A:
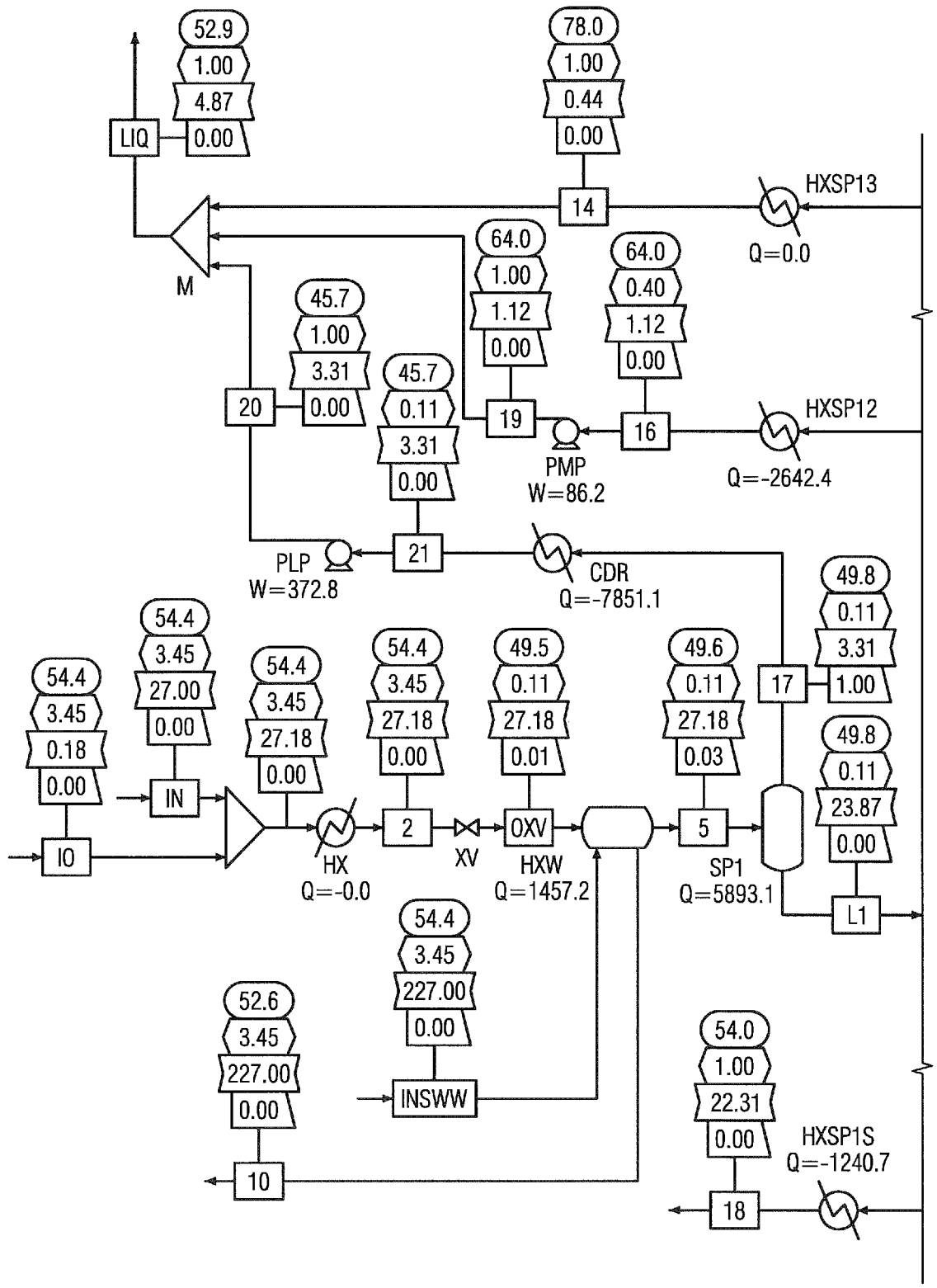
FIGS. 9a and 9b are schematic process diagrams of the multistage, in-series water treatment system, as shown in FIG. 4, with a hydrocarbons content, in accordance with an embodiment of the invention.
Figure 9B:
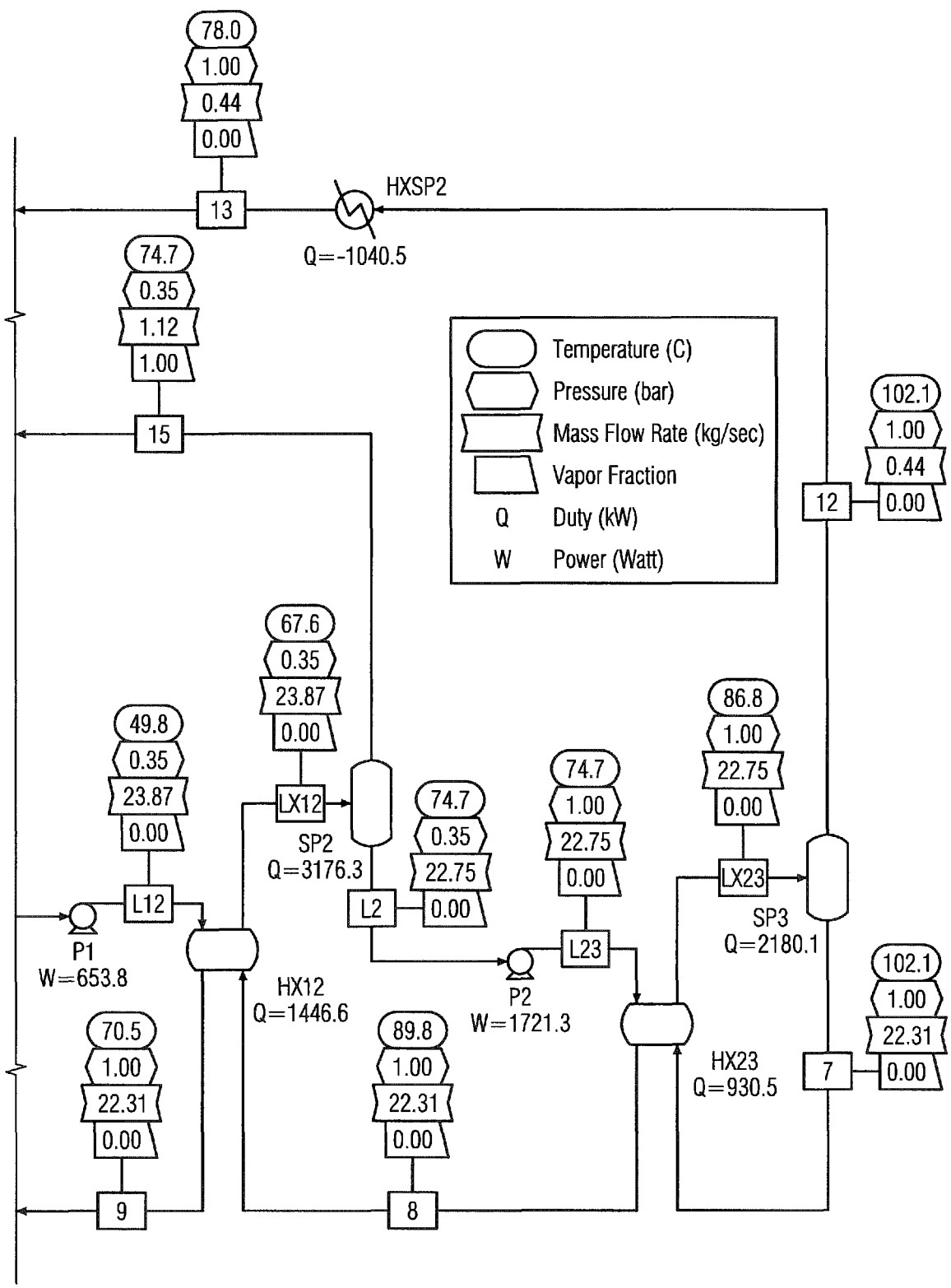

FIGS. 8a, 8b, 9a, and 9b show variations of the multi-stage, in-series water treatment system, as shown in FIG. 4, in accordance with various embodiments of the invention. In particular, FIGS. 8a and 8b are schematic process diagrams of the multistage, in-series water treatment system, as shown in FIG. 4, without a hydrocarbons content, in accordance with an embodiment of the invention, while FIGS. 9a and 9b are schematic process diagrams of the multistage, in-series water treatment system, as shown in FIG. 4, with a hydrocarbons content, in accordance with an embodiment of the invention.

FIGS. 8a, 8b, 9a, and 9b were illustrated using a simulation workbench in an Aspen Plus™ environment for simplified schemes of the process, according to various embodiments, where the heat exchangers were explicit (exploded view) to better understand the numbers and to visualize what is happening in the system under operation. FIGS. 8a, 8b, 9a, and 9b show that all components can be thermodynamically simulated using an Aspen Plus™ Process Simulation software package and that the resulting heat duty at each heat exchanger allows the calculation of all the required heat duties for each stage, subsequently checking that the required energy is available, or not, in situ at the GOSP. For example, in accordance with at least one embodiment, the gas compressors in the GOSP are enough to cope for all the heat exchangers' duties and to produce the targeted amount of treated water, for example 4.8 kg/s, for specific applications for a desalter vessel existing at a GOSP facility.

The present invention may suitably comprise, consist or consist essentially of the elements disclosed and may be practiced in the absence of an element not disclosed. For example, it can be recognized by those skilled in the art that certain steps can be combined into a single step.

Unless defined otherwise, all technical and scientific terms used have the same meaning as commonly understood by one of ordinary skill in the art to which this invention belongs.

The singular forms "a", "an," and "the" include plural referents, unless the context clearly dictates otherwise.

As used herein and in the appended claims, the words "comprise," "has," and "include" and all grammatical variations thereof are each intended to have an open, non-limiting meaning that does not exclude additional elements or steps.

"Optionally" means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

Although the present invention has been described in detail, it should be understood that various changes, substitutions, and alterations can be made hereupon without departing from the principle and scope of the invention. Accordingly, the scope of the present invention should be determined by the following claims and their appropriate legal equivalents.

What is claimed is:

1. A method for producing a treated water stream, the method comprising steps for:
   receiving a feed water stream comprising at least one substance mixed in a water phase; and
   processing the feed water stream in a plurality of stages arranged in operation from a lowest temperature and pressure to a highest temperature and pressure, to produce the treated water stream and a concentrated stream,
   wherein each stage comprises a vessel, a heat exchanger, an evaporator, and a condenser,
   wherein operation of an external heat exchanger in each stage is directly fluidly coupled to waste heat or energy available from an external heat source, and wherein the external heat exchanger is configured to receive the waste heat or energy available from the external heat source to heat the feed water stream inside the vessel to partially evaporate water from the feed water stream at each respective stage, independent of the heat provided by the waste heat or energy available from the external heat source to the external heat exchangers at the other stages,
   wherein each evaporator is configured to evaporate an amount of water using one of direct heat or indirect heat, and
   wherein each condenser is configured to condense at least a portion of steam generated by a successive stage,
   wherein the receiving the feed water stream comprises receiving a produced water main stream,
   splitting the produced water main stream into a heating stream, which is used for heating purposes, and a produced water stream, which is used for the generation of treated water, and
   heating the produced water main stream, using the heating stream, before entering the heat exchanger of a first stage of the plurality of stages.

2. A method of claim 1, wherein the plurality of stages is arranged in series, wherein a first stage receiving the feed water stream is operated at the lowest temperature and pressure compared to the other stages.

3. A method of claim 1, wherein the plurality of stages is arranged in parallel, each stage being configured to receive the feed water stream from a same source and further configured to exchange heat with one another.

4. A method of claim 2, wherein the step of processing further includes
   feeding the feed water stream into the first stage operated at the lowest temperature and pressure compared to the other stages, an evaporator of the first stage being configured to produce a water vapor stream that is condensed by a condenser of the first stage to produce a first treated water stream,
   extracting a brine-concentrated stream from the evaporator of the first stage and feeding the brine-concentrated stream to an evaporator of a second stage, the second stage comprising a higher temperature and pressure than the first stage, to produce an additional treated water stream and a successive brine-concentrated stream that is fed to an evaporator of a successive stage for the plurality of stages, each successive stage comprising a higher temperature and pressure than a preceding stage, an evaporator of each successive stage being configured to produce an additional treated water stream and a successive brine-concentrated stream that is fed to an evaporator of a successive stage for the plurality of stages, and
   extracting brine from the brine-concentrated stream from an evaporator of a stage having the highest temperature and pressure compared to the other stages, the extracted brine being used to provide energy to heat the brine-concentrated stream being fed to each of the evaporators of the plurality of stages.

5. A method of claim 4, wherein the extracted brine from the stage having the highest temperature and pressure compared to the other stages is used to provide energy to the evaporators of the plurality of stages from a highest temperature and pressure to a lowest temperature and pressure.

6. A method of claim 1, wherein each evaporator comprises a compensating heating system configured to use direct heat provided by at least one of electric heating, convective heating from a heat carrier fluid, combustion, and oxidation.

7. A method of claim 1, wherein the feed water stream is a stream of brine water produced from one of a saline aquifer, a stream of brackish water from an industrial process, or a mixture of water comprising organic contaminants.

8. A method of claim 1, wherein the feed water stream is a stream of brine water produced from one of a gas production field or a crude oil production field.

9. A method of claim 1, wherein the feed water stream is a produced water stream available at a crude oil and natural gas processing facility, the feed water stream comprising one of a liquid or dissolved hydrocarbon or additive chemical, and the produced water stream is one of a pressure aerobic or anaerobic stream.

10. A method of claim 1, wherein the feed water stream comprises a water phase and another immiscible or partially miscible fluid phase, the immiscible or partially miscible fluid phase comprising one of a non-dissolved gas phase, an oil phase, or dispersed solid particles in a proportion ranging from 1 ppm to 10% in volume, the method for producing the treated water stream further being used to separate the water phase and the another immiscible or partially miscible fluid phase.

* * * * *